UNITED STATES PATENT OFFICE.

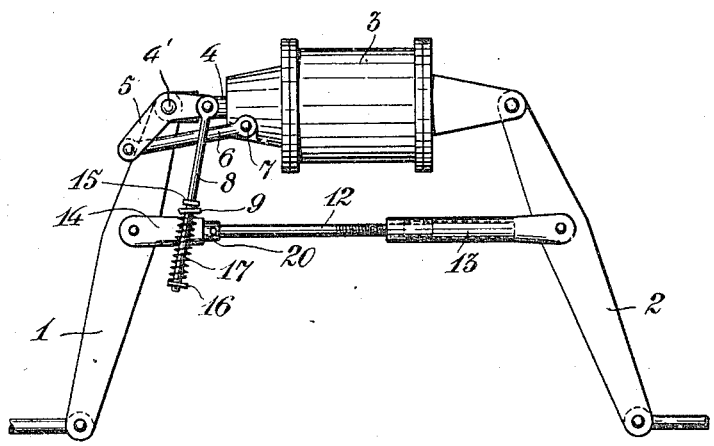
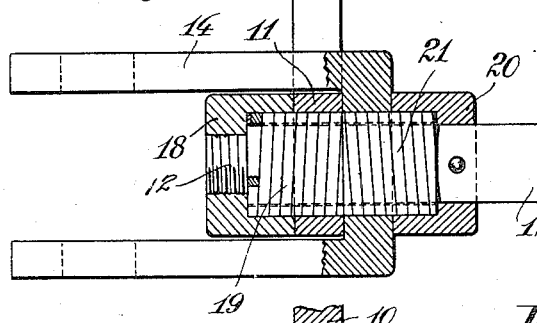
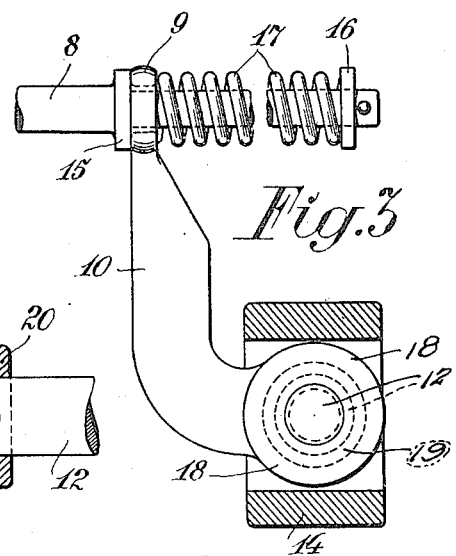
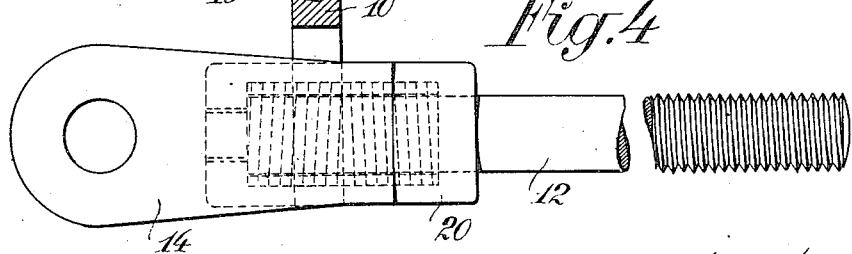

AXEL RUDOLF KONRAD DJURSON, OF MALMÖ, SWEDEN.

AUTOMATIC SLACK-ADJUSTER FOR RAILROAD-BRAKES AND THE LIKE.

1,294,780.        Specification of Letters Patent.        Patented Feb. 18, 1919.

Application filed May 24, 1917.   Serial No. 170,620.

*To all whom it may concern:*

Be it known that I, AXEL RUDOLF KONRAD DJURSON, a citizen of Sweden, and resident of Malmö, Sweden, (whose post-office address is Malmö, Sweden,) have invented new and useful Improvements in Automatic Slack-Adjusters for Railroad-Brakes and the like, of which the following is a specification.

This invention relates to improvements in automatic slack adjusters for brakes on railroad cars or street cars of the type wherein a turnbuckle is connected with its driving member and with a yielding locking member in such a way that the adjusting of the slack takes place independently of the maximum stroke of the brake mechanism and also of the elasticity of the brake mechanism and of the amount of braking power used for applying the brakes. Hitherto this has been attained in such a way that the turn-buckle at the beginning of the applying of the brake, *i. e.*, before the brake mechanism is strained, has been adjusted by its driving member and locked by the yielding member as soon as the frictional resistance in the threads of the turn-buckle prevents a further turning of the latter, the further movement of the driving member then being taken up by the yielding member. Thus the adjusting of the slack takes place during the applying, or rather shortly before the applying of the brake shoes to the wheels.

The object of the present invention is to provide means for effectuating the adjusting proper during the loosening of the brake which in some cases might be of advantage, as then the brake mechanism always is already in a position to act with the proper slack as soon as the brake is applied.

Thus according to the invention the actuating means does not directly act upon the slack regulating member at the applying of the brake but is only adjusted or subject to a movement corresponding to the movement necessary for the adjustment of the slack, and the regulating does not take place until the brake is loosened when the actuating mechanism is carried back to its initial position, that is to say that the actuating member is moved so much during the applying of the brake as is needed in order to apply so great a motion to the regulating mechanism when the actuating member is carried back during the loosening of the brake as would be the case if the adjusting proper had taken place during the applying of the brake instead of during the loosening of the same.

A simple and preferred embodiment of the invention is illustrated in the accompanying drawing.

Figure 1 shows the device adapted to an ordinary air brake. Fig. 2 shows the actuating device on a greater scale, partly in section, and Figs. 3 and 4 represent two other views of the same.

The slack adjuster proper which for instance consists of a screw and a threaded sleeve is arranged between the two levers 1 and 2 between the upper ends of which the brake cylinder 3 is placed. The lower ends of the levers are in a known way connected with rods leading to the brake shoes. The piston rod 4 in the brake cylinder is connected with the upper end of the lever 1 and also with a lever 5 which is connected with a link rod 6 the other end of which is pivoted on a pin 7 fastened on the cylinder. The other end of the lever 5 is connected with a rod 8 going through an eye 9 on an arm 10 projecting from a sleeve 11 that is made to turn around the screw 12 which together with the threaded sleeve 13 forms the slack adjuster proper. The sleeve 13 is connected with the lever 2 and the screw 12 is made to turn in a fork 14 connected with the other lever 1. The rod 8 is provided with a collar 15 normally pressed against the eye 9, and a spring 17 is placed between the eye 9 and a washer 16 on the end of the rod 8. The sleeve 11 on the arm 10 is fitted between the bottom of the fork 14 and a cap 18 fastened to the end of the screw 12 in the fork. The cap 18 has a greater inside diameter than the screw 12 and exactly the same diameter as the sleeve 11. A spring 19 is freely fitted in the sleeve and the cap 18 and the outside diameter of said spring is the same as the inside diameter of the sleeve and the cap, and thus it does not prevent the turning of the sleeve 11 in one direction, but when the sleeve is turned in the opposite direction the spring is carried with it as it then tends to expand, and thus the spring also turns the cap 18 and the screw 12. On the other side of the bottom of the fork 14 a sleeve 20 is fastened on the screw 12, and the inside diameter of this sleeve is larger than the diameter of the screw and exactly of the same size as the hole in the bottom of the fork. A spring 21 wound in an opposite direction to the spring 19 and having the same outside diameter as the inside diameter of the sleeve 20 and the hole in the fork is loosely fitted into the same.

When the piston rod 4 in applying the brake travels outward the lever 5 is turned in such a way that the rod 8 is lifted and the spring 17 carries the arm 10 with it whereat the sleeve 11 turns freely around a spring 19 and the screw 12 until a tension arises in the system when the brake shoes commence to press against the wheels. Then the screw 12 is exposed to a strain and the cap 18 jams the sleeve 11 against the bottom of the fork in such a way that the further turning of the sleeve 11 is prevented on account of the friction. Then the further turning power is taken up by the spring 17 which is compressed, and the collar 15 moves away from the eye 9. When the brake is loosened the collar 15 again hits the eye 9 and the arm 10 with the sleeve 11 is then turned back to the starting point, whereat, however, the spring 19 in the sleeve 11 takes part in the rotation as the rotation takes place in a direction opposite the winding of the spring. Thus the cap 18 is turned by the spring and also the screw 12 in such a way that the slack is lessened in proportion to the angle in which the arm 10 was turned when the brake was applied, i. e., exactly as much as the superfluous slack.

The spring 21 has for its object to prevent that the screw 12 occasionally is turned when the brake is applied on account of the friction then arising between the hole in the fork and the end of the spring situated in said hole.

It is apparent that various changes in the details of construction may be resorted to without departing from the spirit of the invention.

Having thus described my said invention, what I claim as new and desire to secure by Letters Patent, is:

In an automatic slack adjuster the combination of a brake mechanism including a turnbuckle connecting parts thereof, actuating means adapted to be adjusted when the brake is applied into a position to rotate the turnbuckle in direction of lessening the slack when the brake is loosened, and a yielding member adapted to take up the excess motion of said actuating member when the frictional resistance in the turnbuckle checks the further movement thereof.

In testimony whereof, I have signed my name to this specification in the presence of two subscribing witnesses.

AXEL RUDOLF KONRAD DJURSON.

Witnesses:
A. W. ANDERSON,
FRED FLERON.